Oct. 19, 1948. C. CHILOWSKY 2,451,917
METHOD OF AND APPARATUS FOR CONTROLLING THE
FLIGHT OF DIRIGIBLE AERIAL TORPEDOS
Filed Aug. 2, 1941 6 Sheets-Sheet 4
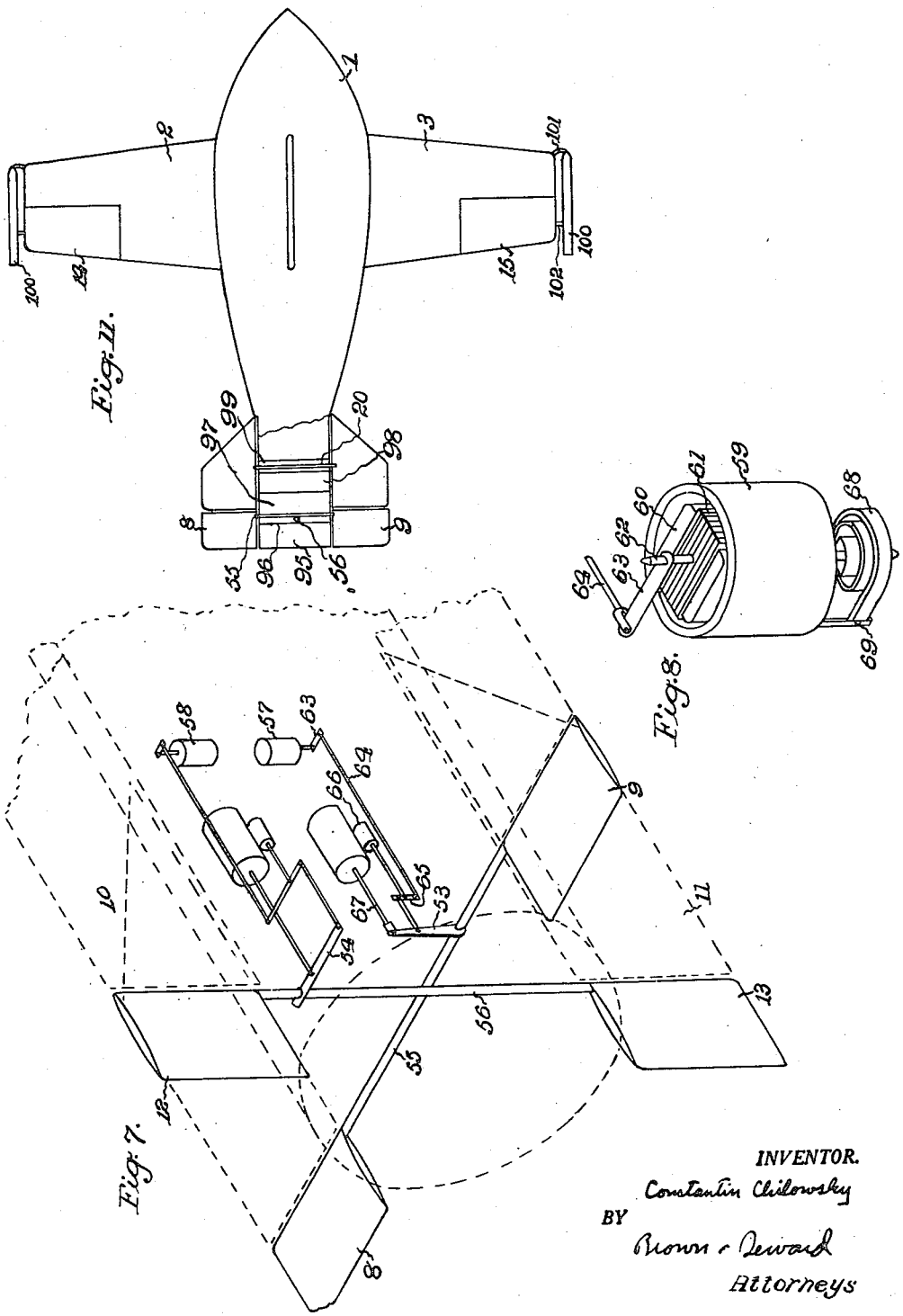
INVENTOR.
Constantin Chilowsky
BY
Brown & Seward
Attorneys

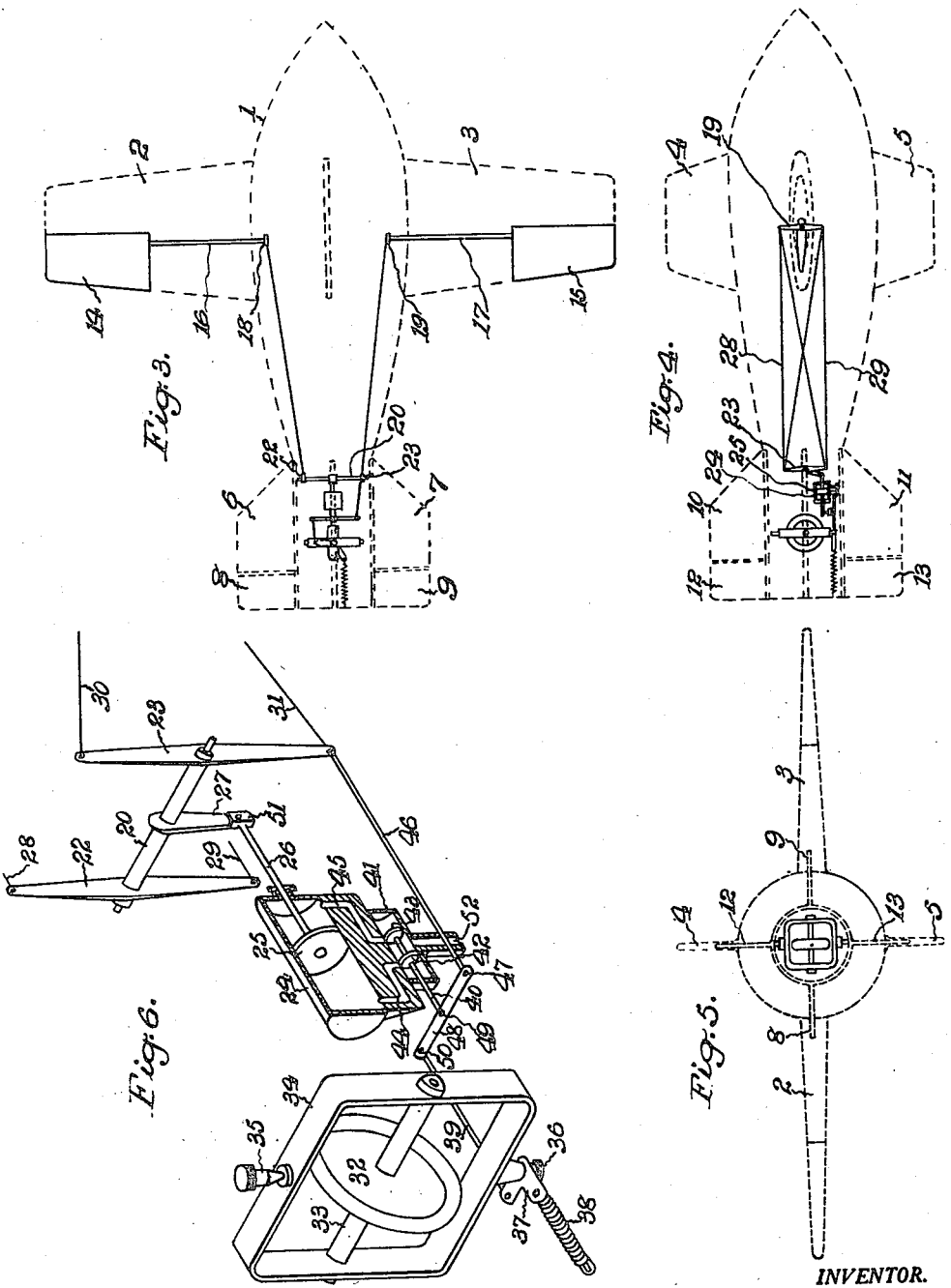

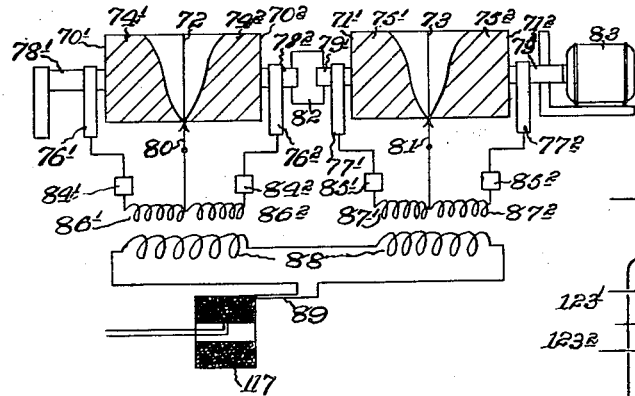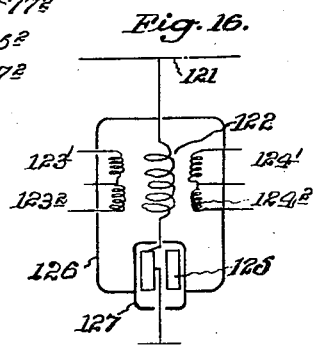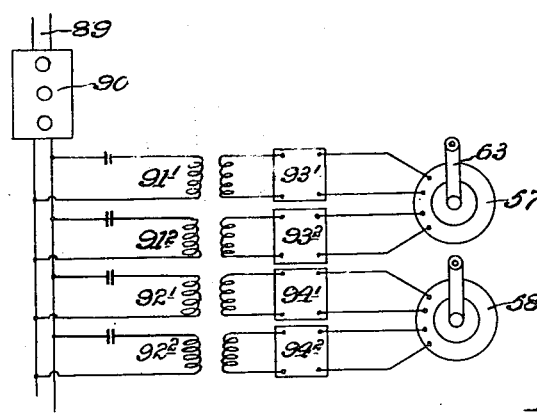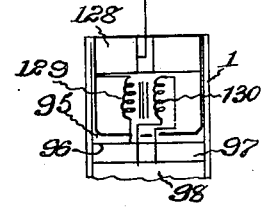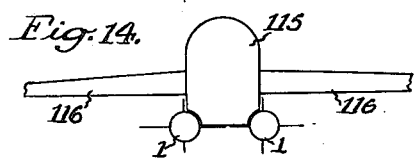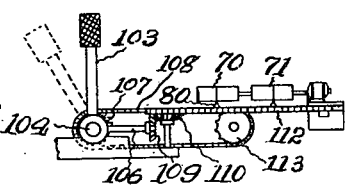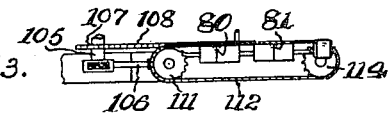

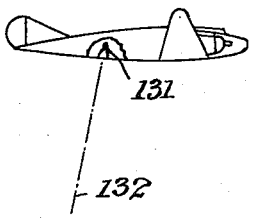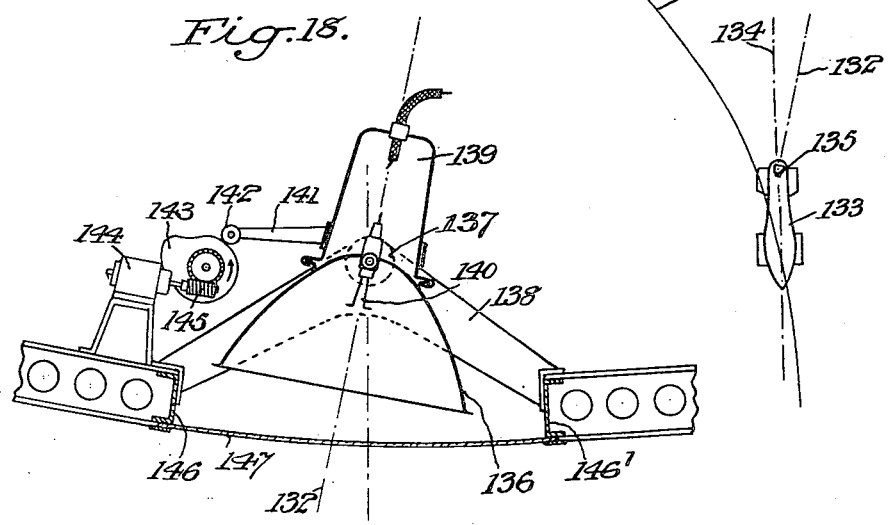

Patented Oct. 19, 1948

2,451,917

UNITED STATES PATENT OFFICE 2,451,917

METHOD OF AND APPARATUS FOR CONTROLLING THE FLIGHT OF DIRIGIBLE AERIAL TORPEDOES

Constantin Chilowsky, New York, N. Y.

Application August 2, 1941, Serial No. 405,166
In France May 19, 1938

21 Claims. (Cl. 244—77)

This invention relates to a dirigible aerial torpedo and method of operating same, particularly such a torpedo which is adapted to be released at a high altitude by an airplane flying at full speed and thereupon directed accurately to a target.

Such a torpedo, equipped with a rudder and controlled by wireless or other suitable remote control means from the releasing airplane, falls with increasing speed and can be guided and directed towards its objective only with some difficulty and uncertainty, because the flier guiding the torpedo has no sure and sufficiently simple criterion for determining how accurately the torpedo has been aimed, and so cannot, in time, impart to the torpedo the succession of movements necessary to ensure its reaching the objective. When the torpedo is nearing its objective an observation of the approximate accuracy of its flight may be made, but it will, as a rule, be too late and too difficult to correct the accumulated deviations and errors and to enforce any necessary major corrections in the trajectory. As a partial solution, there has been a tendency to utilize for dirigible torpedoes trajectories which deviate only slightly from the horizontal, by equipping the torpedo with large sustaining wings and giving it the exterior appearance of a small glider plane, so as to facilitate the task of direction and remote control. This however involves numerous disadvantages such as: a relatively low speed of the torpedo, compared to the speed of the plane; small penetrating force; long duration of the flight; limited maneuverability; large size; and, frequently, an unfavorable falling-angle.

The present invention has for its object the elimination of all the disadvantages mentioned above.

According to this invention, a criterion for directing the torpedo is found in the principle of direct sighting, in accordance with which the torpedo is caused to remain during its fall constantly on the straight line connecting the plane with the target or objective.

According to the essential principle of the invention, the modalities of the plane's flight, particularly its speed and path of flight after release of the torpedo, on the one hand, and the trajectory followed by or imposed upon the torpedo, on the other hand, are coordinated in such a manner that the torpedo remains, over the major part of its trajectory and particularly over a final sufficiently long portion thereof, on the direct line of sighting between the plane and the target or objective.

Changes in the flight of the plane are more difficult and slower to effect, than changes in the flight of the torpedo. Therefore, the invention provides most particularly for that very simple and important case where the plane, after releasing the torpedo, continues on its rectilinear uniform-speed flight, and the direct sighting is effected solely, or principally, by means of imparting to the torpedo, by appropriate controls (wireless, wired or otherwise) from the plane, such a trajectory that the principle of direct sighting is realized over a sufficient part of said trajectory. Most particularly, the invention provides, in the case of uniform and constant plane speed, for the guiding of the torpedo along a special trajectory, permitting direct aiming over the final, sufficiently long, portion thereof, and even over almost its entire length. The sureness and accuracy of hitting the objective will thus be considerably increased. These trajectories are usually relatively abrupt and are, as a rule, incurving rearward, as compared with free-fall trajectories, and they also usually imply the presumption that the torpedo has been released from an altitude of at least several kilometers, for the current speeds of military planes.

It is also provided that, to be maintained on such particularly favorable trajectories, very different from the free-fall trajectory, the torpedo must possess a particularly great maneuverability. Such maneuverability of the torpedo is obtained by giving it a relatively compact exterior aerodynamic outline (as to tail surface and, in most cases, wings), to enable it to attain high final falling-speeds; and these high speeds of tail and wings (even if these are of limited dimensions) will impart to the torpedo, through rudder maneuvering, very large aerodynamical forces, perpendicular to the trajectory, these forces being apt to reach 2,000–3,000 kg. per sq. meter of the wings' surfaces. The high accelerations (perpendicular to the trajectory) caused by these forces, will particularly make possible imparting to the torpedo these special trajectories.

For instance, released from a height of 7,000 meters, the torpedo will be able to reach a final falling-speed of the order of 300 to 400 meters per second, and the lateral aerodynamical reactions on the torpedo can be equal to several times its weight. Under such conditions the torpedo will approximate much more closely a high-speed projectile with wireless flight-control, than a guided glider torpedo. Due to this abrupt and almost vertical trajectory and to the high speed it permits, the torpedo will have a great penetrating force at a favorable striking angle; the duration of the fall will be very short, and the danger to the plane will, because of this, be reduced to a minimum; the torpedo itself will be practically invisible and invulnerable.

In order to be guided, with most complete accuracy, on such steep trajectories, closely approaching, or passing through and exceeding, the vertical, provision is made, according to the invention, for the torpedo to have an artificial stability about its longitudinal axis and to be maintained, during the entire fall period, in a fixed orientation relative to its longitudinal axis, notwithstanding the fact that this longitudinal axis may pass from a horizontal position (at the moment of release) to a more or less vertical position (at the moment of striking the mark).

Contrary to the glider planes and torpedoes where the lateral stability is essentially assured by the position of the center of gravity in relation to the center of sustentation, the dirigible torpedo will not, according to this invention, possess this natural lateral stability; its tail and wings will be arranged diametrically in relation to the torpedo's longitudinal axis. The torpedo will usually have two lateral "horizontal" wings (sustaining wings in horizontal position of the axis) and a pair of tail fins, all located within a plane containing the longitudinal axis; and two wings and tail fins situated in a plane perpendicular to the former (i. e. in a vertical plane), also containing the longitudinal axis. The horizontal tail fins (assuming the longitudinal axis of the torpedo to be in the horizontal position) will be lengthened by guiding tips or rudders, controlling the vertical displacement of the torpedo; the vertically located tail fins will be lengthened by vertical guiding tips or rudders controlling lateral displacements. The torpedo will, in addition, be equipped with rudders or ailerons, controlling rotation about its longitudinal axis, preferably in the shape of extensions of one of the pairs of wings (horizontal or vertical). These rotation control rudders or ailerons are particularly intended to govern the rotation of the torpedo and have the object of preventing, through their aerodynamical reactions, the rotating of the torpedo about its longitudinal axis during its fall. Due to the symmetrical arrangement of the wings and tails, the torpedo will remain, even in vertical position, in a state of equilibrium indifferent to rotation, notwithstanding the considerable aerodynamical forces, in all directions, that the torpedo may be exposed to. Due to this equilibrium, it is possible and easy, by action of the ailerons, to create a couple of aerodynamical forces opposed to any rotation of the torpedo, any time there arises a "disturbing" couple, tending to provoke such rotation.

It is provided that the maintenance of the fixed orientation of the torpedo in regard to its longitudinal axis may be assured by remote control of the ailerons, from the plane, by the operator guiding the torpedo, in the same manner as the control exercised by the plane on the longitudinal and lateral torpedo rudders. In this case the operator will observe visually from the airplane the momentary position of the torpedo relative to its axis, either with the naked eye or by means of a telescope. To make sure of the visibility of the torpedo from the airplane, at very high altitudes, possibly up to and exceeding 10,000 meters, provision is made to equip it with intensely bright magnesium, or preferably alumino-thermic, rear lights. To facilitate, in particular, the control of the torpedo's orientation relative to its axis, provision is made to place these lights (for instance two alumino-thermic tubes) at the two extreme ends of the torpedo's longer wings.

Nevertheless, so as not to complicate unduly the task of the operator in guiding the torpedo, it is most particularly provided, according to the invention, that control of the fixed orientation (relative to the axis) is effected in an entirely automatic manner within the torpedo itself by means of a gyroscope. For such a control it will suffice to utilize a simple gyroscopic system, allowing freedom of two degrees only, for it is not absolutely necessary for the torpedo's orientation relative to the axis to remain rigorously unchanged during its flight; it will suffice that each time a disturbing couple of forces appears, the gyroscope's reaction should cause, by means of a suitable servo-motor acting on the ailerons, an immediate inverse aerodynamical reaction, opposed to the disturbing couple and exercising a strong braking action on the rotation, so as not to permit, during the short duration of the torpedo's flight (of the order of, for instance, 40 sec., and as a rule less than a minute), the total angle of such rotation to exceed a certain limit (for instance 10°). Cable or other suitable control will, under these conditions, still insure the correct guiding of the torpedo. The gyroscope will be arranged in such a manner that its plane of rotation coincides with the vertical plane containing the torpedo's trajectory. The axis of the gyroscope will therefore be horizontal and perpendicular to this plane, and the transition of the torpedo's longitudinal axis from a horizontal position to a more or less vertical position will not disturb the reactions of the gyroscope.

Remote control of the dirigible torpedo from an airplane can be effected, according to the invention, by any suitable method: for instance, by electro-magnetic radio waves, or by optical means. But in the methods of remote control by Hertzian waves it is found difficult to sufficiently safeguard the remote control against interference by the enemy, particularly because the radio connection between the torpedo and the airplane becomes rapidly weaker with the increase of distance between them, while the possibility of interference increases rapidly at the same time with the approach of the torpedo to its target (assumed to be defended by powerful radio stations equipped to send out interfering signals). On the other hand, optical control methods are considerably impeded by the strong light emitted by the sky and are often made impossible by the direct action of the sun rays.

It is therefore, according to this invention, particularly intended to utilize the method of remote control by an electric cable, constantly connecting, physically and electrically, the airplane with the torpedo during the latter's fall. This cable, wound into the form of coils which are placed in the airplane or the torpedo, or preferably in both of them, will unwind itself freely, upon the release of the torpedo, either from the airplane or the torpedo or, preferably, from both of them simultaneously. This method of remote control provides an absolute safe-guard against interference or jumbling by the enemy. It is particularly intended to utilize a cable with two concentric conductors, insulated from each other, the inner conductor consisting of a thin copper wire, suitably insulated, and the outer conductor being formed by a braiding of steel threads of very high mechanical resistance. This cable may have a total diameter of the order of 1 to 1.5 mm. A cable of this description will possess great safety in respect to its high breaking strength and will be most convenient and safe to transmit electric currents, for lengths of the order of 10 kilometers, above envisaged.

In the air the cable will finally assume, in its upper part, the shape of a large suspended curve, concave toward the direction of motion of the plane. For a bombardment altitude of, for instance, 7,000 meters, the length of the cable may be of the order of one and a half times this distance.

Remote control through this cable is effected, according to the invention, preferably by means of alternating currents of relatively low frequencies, for instance not over 1,000 cycl./sec., in order to minimize the weakening of the current along the cable and to make sure of sufficient voltage reaching the torpedo. It is intended, generally, to utilize four different frequencies, two of which will control the depth rudder (rudder for longitudinal displacements) and the two others the rudder for lateral displacements. As to each rudder, one frequency actuates it in one direction from the zero position, and the other in the other direction. These frequencies, upon reaching the torpedo, are separated by means of resonance circuits and thus operate the mechanisms controlling the different rudders. The operating or servo-motors used may be electric, compressed-air, or other suitable types. Compressed-air motors, supplied, for instance, from a compressed-air flask, may particularly be provided by the invention. At the same time provision has been made to insure quantitative and proportional remote control, meaning that to certain definite positions of the control levers in the airplane there will correspond certain definite inclination angles of the torpedo rudders.

For this purpose the remote control is effected by means of a constant number of alternating-current impulses sent from the airplane to the torpedo; the duration of each impulse being varied by the operator in the airplane, directing the torpedo. On the torpedo, following the amplification and separation, by resonance, of the currents of various frequencies, use is made of thyratron type receivers (or of special tube assemblies, giving similar results), wherein the secondary current is not affected by the intensity of the primary current; the mean intensity of said secondary current will, consequently, vary with the duration of the impulses sent and will be proportionate to the integral of these durations. This integral is independent of the intensity of the impulses and of any variations to which it may be subject during its passage through the cable.

A practical embodiment of the invention and a graphic showing of its principle of operation is illustrated in the accompanying drawings wherein Fig. 1 illustrates, in graphic form, the general principle of direct sighting;

Fig. 3 represents, in broken lines, the general configuration of a torpedo, in top plan view; the automatic stabilizing apparatus and ailerons being shown in full lines;

Fig. 4 represents a side elevation of the torpedo shown in Fig. 3;

Fig. 5 represents a rear end view of the torpedo shown in Figs. 3 and 4;

Fig. 6 represents, in isometric projection, an enlarged detail of the automatic stabilizing control apparatus;

Fig. 7 represents, in isometric projection, the rudder control apparatus;

Fig. 8 represents an enlarged detail of a moving coil galvanometer for operating the rudder controls;

Fig. 9 represents a wiring diagram of the signal transmitting apparatus located in the airplane;

Fig. 10 represents a wiring diagram of the signal receiving and translating apparatus located in the torpedo;

Fig. 11 represents a top plan view of the torpedo, showing diagrammatically the provision of compartments adapted to contain the control mechanisms, and also showing the attachment of lighting means on the wing tips;

Figs. 12 and 13 represent, in side elevation and top plan view, respectively, a suitable form of control mechanism for operating the signal transmission apparatus shown in Fig. 9;

Fig. 14 represents diagrammatically an end view of an airplane carrying two torpedoes;

Fig. 15 represents a side elevation of the airplane shown in Fig. 14, including the mounting of a coil of cable for communication between the airplane and the torpedo;

Fig. 16 represents a wiring diagram of the signal transmitting and receiving apparatus involving the use of a single wire connection between the airplane and the torpedo;

Fig. 17 represents diagrammatically the relation between an airplane and a torpedo controlled by short wave from said airplane;

Fig. 18 represents in vertical longitudinal section a short wave radio transmitting unit installed in an airplane; and Fig. 19 is a similar view of the receiving unit mounted in the rear end of the torpedo.

Figure 1:
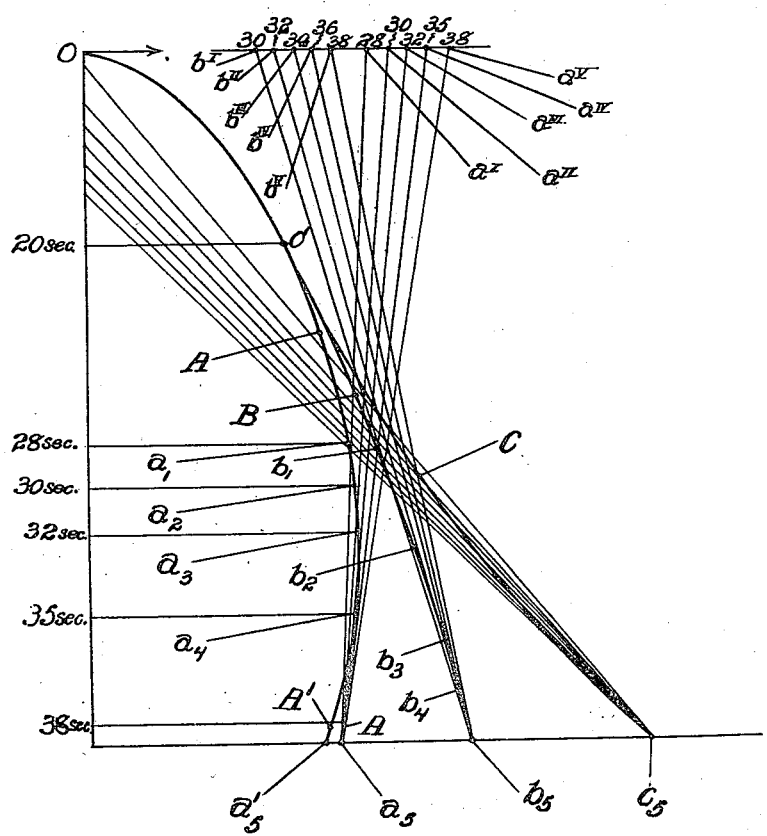

Referring to the drawings, Fig. 1 illustrates the principle of direct sighting in its general form as a method of coordination of an airplane's flight, or flight maneuvers, and the fall modalities, imparted to the torpedo by remote control, with the object of effectuating the principle of direct sight.

In Fig. 1 the curves A, B and C represent graphically three different types of trajectories. Trajectory B is obtained by setting the depth rudder of the torpedo in its median, neutral or zero position. That is, it is the trajectory of free fall of the torpedo under the action of gravity. Trajectory A represents the case where, for instance, from the 20th second to the 35th second, the rudder is set in a pronouncedly negative (rearwardly, with respect to the direction of flight of the plane) position; and trajectory C where it is set, from the 20th second on, in a positive (forward) position (up to the 20th second in both cases and after the 35th second in the case of trajectory A the rudder is set at zero). The torpedo is assumed to possess only small maneuverability (limited wing and tail surface), and Fig. 1 serves only as a comparative illustration. The torpedo is assumed to be released by the airplane at an altitude of 7,000 meters at an initial horizontal speed of 100 met./sec. The torpedo's weight is assumed to be 1,000 kg. For this weight the horizontal component of the torpedo's speed is assumed to be normally constant and equal to 100 met./sec. On the upper abscissa are marked the seconds for the airplane's flight after the release of the torpedo; on the ordinate the seconds for the fall of the torpedo, from zero (marking the moment of its release). The straight lines leading from the airplane (upper abscissa) to the target are lines of direct sighting from the airplane to the target. If the torpedo, at given moments of the airplane's flight, is found to be on the corresponding lines, then the corresponding part of its trajectory is a direct-sight trajectory.

If the airplane flies in a straight line and maintains its initial speed, assumed to be 100 meters per second, it will, at the end of 28, 30, 32, 35 and 38 seconds, respectively, be found to be at points $a^I$, $a^{II}$, $a^{III}$, $a^{IV}$, $a^V$. At the same instants, in following traectory A, the torpedo, which is respectively located at $a_1$, $a_2$, $a_3$, $a_4$, $a_5$, will be found, from pointt $a_1$ on, on the corresponding direct line of sight to its target, as. Trajectory A, from the 28th second, is a trajectory of actual direct sight for an airplane flying in a straight line at constant speed.

In Fig. 1 there is shown, at B, a free-fall trajectory, obtained by maintaining the rudder during the fall constantly in the torpedo's plane of symmetry. It can be seen that this trajectory is not a trajectory of direct sight for an airplane in rectilinear flight at the speed of 100 meters per second. On the other hand, it will become a direct-sight trajectory for an airplane in continuous rectilinear flight which, during the first 30 seconds is retarded by 13 seconds, or for a second airplane which follows the first one at 13 seconds' interval. The delayed airplane, or the second one, would consequently find itself at $b^I$ at the 30th second, and at $b^V$ at the 38th second, the target being located at $b_5$ and the successive positions of the torpedo during its fall being at $b_1$, $b_2$ . . . $b_5$ on the corresponding direct-sight lines starting from points $b^I$, $b^{II}$ . . . $b^V$.

The airplane can be retarded by a temporary decrease of its speed or by a lengthening of its course, achieved by causing it to follow an appropriate sinuous path, or by causing it to describe a loop intercalated in its course.

Trajectory C in Fig. 1 is obtained by setting the torpedo's rudder, beginning with the 20th second, at 30° for instance in a position inclined forward. It can be shown, likewise, that, beginning with the 30th second, this will result in a direct-sight trajectory, but only for an airplane which, at the 29th second, is located at the initial point 0 and is traveling with a speed of 100 met. per second in a direction the reverse of that indicated by the arrow, i. e. away from the target $C_5$. This trajectory is considerably more sloping and more elongated than the preceding ones. The points representing the respective positions of the airplane at the 30th, 32nd . . . 42nd second are more and more removed to the left from point 0 and are not visible in the drawing. In order to reach these positions, an airplane, that has released at 0 its torpedo (while moving in the direction of the arrow), can be made to describe a complete U-turn, which will bring it back in 29 seconds to point 0 with the same speed. It is also possible to entrust to a second airplane, flying in the opposite direction, the task of observing and controlling the torpedo.

As has been shown in connection with trajectories of the type of B and C, it can often be of advantage to have a second airplane control the torpedo, such airplane flying at a suitable distance behind the airplane releasing the torpedo, or flying in the opposite direction, and for which the trajectory imparted to the torpedo is a direct-sight trajectory.

If the connection between the first airplane and the torpedo is maintained not by means of cable, but by Hertzian waves or by luminous rays, by methods indicated in the above mentioned patent, then the observer placed in the second airplane, provided with optical observation and control apparatus, will guide the torpedo directly toward the target by means of such controls, without passing through the intermediary of the first airplane, as would be necessary in the case of a cable connection.

The second airplane can itself be the carrier of a torpedo, which, after being released at the desired moment, will be guided to its target by an operator on a third airplane, and so on. Provision is thus made to have two or more airplanes collaborate in the guidance of a series of torpedoes, directed at the same target, or at different targets.

It will also be understood that the same airplane can carry several torpedoes and release them successively at appropriate time intervals; or that it may even release them simultaneously if the plane carries several operators equipped with sighting apparatus.

Figure 2:
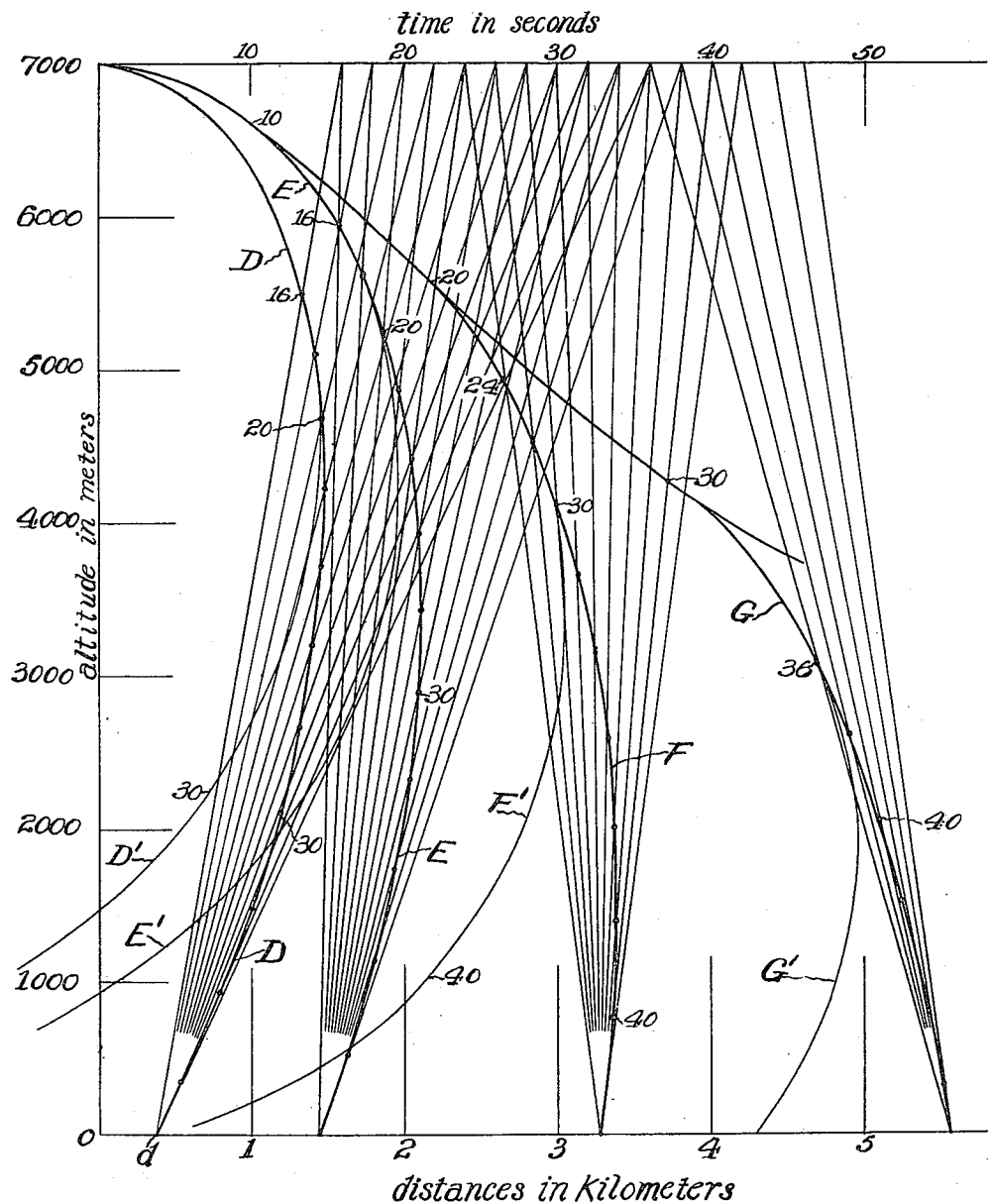
Fig. 2 illustrates in a like manner certain special forms of trajectories having practical advantages.

Fig. 2 specifically illustrates a special case, particularly interesting from the practical point of view, wherein the airplane, after releasing the torpedo, maintains its horizontal rectilinear flight at the same constant speed. This figure relates to a torpedo equipped with wings and tails and possessing average maneuverability, such as is practically obtainable.

In Fig. 2 the curve D represents the trajectory of the torpedo for the case where its depth rudder is set, from the moment of the torpedo's release, in the extreme negative or rearward position. Direct sighting is established beginning with the 16th second at an altitude of 5,500 meters. Should the rudder continue to remain in its extreme position, the torpedo would follow trajectory D', and would, even after 40 seconds of falling, not touch the ground, but would pass, in a horizontal tangent movement, at some 600 meters above the ground. Actually, however, the operator guiding the flight, will begin to correct the torpedo's rudder position from the 16th second on, and will operate the rudder during the remainder of the torpedo's flight, so as to maintain direct sighting on the target $d$, with rudder positions quite far from the extreme one. In this way the torpedo will maintain, over this entire direct sight trajectory, a great and comfortable maneuverability in both directions.

Curve E of Fig. 2 represents the trajectory obtained by setting the depth rudder, from the moment of the torpedo's release, in the extreme positive or forward position, but only for the first ten seconds of the fall. After the tenth second the rudder is reversed and set in various negative positions, the operator working the rudder as before, while keeping still further away from the extreme rudder position and maintaining a still greater maneuverability than with trajectory D. The extreme trajectory of maximum incurvation is represented by curve E'. Direct sight is achieved with trajectory E from the 16th second on, but at an altitude of 5,950 meters, so that more than $\frac{1}{10}$ of the total fall is negotiated under direct sight conditions.

Curve F is obtained by setting the rudder in the extreme positive or forward position from the moment of the torpedo's release and up to the 20th second, at which point the rudder is reversed to a negative position, with very great maneuverability for the remainder of the flight. Direct sighting is achieved beginning with the 24th second, at an altitude of approximately 5,000 meters. This trajectory is remarkable for its almost complete verticality over the last two kilometers. The corresponding extreme trajectory of maximum incurvation is represented by F'.

Curve G of Fig. 2 is obtained by setting the rudder for 30 seconds in the extreme positive or forward position, thereafter reversing the rudder into the extreme negative position, and subsequently operating the rudder in a normal manner. Direct-sighting will be achieved only from the 36th second on, at an altitude of 3,100 meters. The extreme incurvation trajectory is represented by G', the initial part of which, up to the 30th second, is somewhat of "glider" character, showing—if it is compared, for instance, with trajectory E—the advantages of abrupt trajectories over glider ones. The numerals marked alongside the trajectories denote the time in seconds for the torpedo to reach the point indicated in following the trajectories referred to.

The described method of abrupt trajectories and symmetrical torpedoes has, beside others, the following advantages: Direct sighting, achieved very quickly and at great altitudes, giving the possibility of great accuracy; the short total duration of the bombardment action, important for the airplane's safety; great speed of the torpedo's fall, resulting in very considerable penetration-force. The symmetrical torpedo permits achievement of these trajectories, because of its great maneuverability in every direction.

A torpedo and controls therefor, suitable for operation in accordance with the principle above explained is shown in Figs. 3 to 15.

Figs. 3, 4 and 5 represent top, side and end views of a dirigible torpedo, wherein its fixed orientation relative to its longitudinal axis is automatically maintained by means of a gyroscope. The other controls—longitudinal and lateral—are not shown in these figures, in order to avoid undue complication. Referring to the drawings 1 designates the body of the torpedo; 2, and 3, the lateral wings, generally symmetrical in relation to the longitudinal axis; 4 and 5, are the two stationary wings, located in the vertical plane, and likewise symmetrical in relation to the longitudinal axis; these wings being generally smaller than the lateral wings. 6 and 7 are the lateral tailpieces; 8 and 9, the longitudinal displacement controls, arranged as extensions of said tailpieces; 10 and 11 are tailpieces similar to the lateral tailpieces 6 and 7 but located in the vertical plane; 12 and 13 are lateral displacement controls of the torpedo, arranged as extensions of tailpieces 10 and 11; 14 and 15 are the ailerons, controlling the rotation of the torpedo about its longitudinal axis, and formed as partial extensions of wings 2 and 3; 16 and 17 are the rotation axles of ailerons 14 and 15; 18 and 19 are the control levers for the said ailerons and are rigidly connected to the inner ends of axles 16 and 17. 20 is a horizontal axle, parallel to axles 16 and 17, with its ends supported by the body of the torpedo, preferably in the tail portion thereof; 22 and 23 are control levers rigidly mounted on the axle 20. 24 is a compressed-air servo-motor having a piston 25 which actuates, by means of piston rod 26 and lever 27, the rotation of axle 20 and the rocking of levers 22 and 23, connected to it. Lever 22 controls, by means of the wires or rods 28 and 29 and the lever 18, the aileron 14, while lever 23 controls by means of the crossed wires or rods 30 and 31 and the lever 19, the aileron 15, moving it in a direction opposite to that of aileron 14. Thus, for instance, a movement of piston 25 toward the front end of the torpedo will depress aileron 14 and raise aileron 15, creating through aerodynamical reaction of the air a moment of rotation of the torpedo about its longitudinal axis. A movement of the piston toward the rear causes a moment of rotation in the opposite direction. The servomotor 24 is equipped with a sensitive compressed air distributing valve, shown in Fig. 6, this valve being operated by means of a gyroscopic mechanism.

Referring particularly to Fig. 6, 32 represents the wheel of the gyroscope, turning in the vertical plane containing the torpedo's trajectory and its longitudinal axis. 33 is the axle of the gyroscope, parallel to axles 16 and 17 of the ailerons. 34 is the gyroscope's frame, supporting the axle 33; frame 34 being itself held in place by the two fixed pivots 35 and 36, supported from the body of the torpedo; 37 is a bell crank lever rigidly connected to frame 34; 38 is a spring, tending to maintain the frame in a fixed position, by its connection at one end to the lever 37 and at its other end to the body of the torpedo. The other end of the bell crank lever 37 is connected to a rod 39 which operates the compressed air distributing valve of the servo-motor 24. 40 is the axial rod of the distributing valve 41, with its two pistons 42 and 43, controlling the inlet ducts 44 and 45 for admitting compressed air into the cylinder of the motor 24. 46 is a rod connected with operating lever 23, and at the same time with axle 20 and lever 22, which are rigidly connected with lever 23. The other end of rod 46 is connected, by means of a joint 47, with lever 48, which itself is connected, by means of joint 49, with rod 40 of the air valve, and, by means of joint 50, with rod 39 from the gyroscope. Lever 27, rigidly connected with axle 20, is connected, by means of joint 51 (represented schematically), with axial piston rod 26 of piston 25. 52 is the compressed-air duct for the distributing valve and is connected to a compressed-air flask, not shown. The cock of this flask will be automatically opened, at the moment of release of the torpedo by the airplane, by some suitable means (for instance by a string attached to this cock and tied to the airplane, said string, immediately upon the release of the torpedo, pulling on the cock to open it, and breaking off thereafter).

The operation of the apparatus just described is as follows:

When the torpedo starts to turn about its longitudinal axis, frame 34 of the gyroscope tends to turn about the axis passing through 35—36, and, through the medium of rod 39 and lever 48, exerts a thrust on distributor rod 40, pushing it for instance forward, and opening slightly the air intake 45 in the front compartment of cylinder 24. This causes piston 25 to be driven to the rear, actuating axle 20, lever 23, rod 46 and lever 48, thus imparting to the distributor rod and piston 42, 43 a displacement toward the rear, tending to close the air intake 45. In case of rotation of the torpedo in the opposite direction, an inverse cycle will take place in an entirely similar manner, and piston 25 will be driven toward the front. The greater the rotation of frame 34, the greater will be the displacement of piston 25 which will again close the air intake. To each position of frame 34 there will correspond a position of piston 25, and (as made clear in connection with Figs. 3, 4 and 5) a certain definite position of the rotation-controlling ailerons. Consequently, any "disturbing" couple, acting on the torpedo and tending to cause its rotation will evoke through the ailerons an opposite aerodynamical couple, resisting such rotation, said couple being proportional to the speed of rotation of the torpedo. In this manner a braking effect on such rotary motion will be obtained, which can be made sufficiently powerful to keep, for instance, for a period of 40 seconds (duration of the fall), the total rotation of the torpedo within less than 10°. Besides, the "disturbing" couples will generally tend to act in opposite directions, and will, in many cases, compensate themselves, at least partially.

Fig. 7 represents schematically the controls for the two pairs of the torpedo's rudders. The mechanism of each control is similar to that of the ailerons shown in Figs. 3 to 6, with the difference that the two control levers 53, 54 are rigidly fixed directly on their axles 55, 56, and both act in the same direction; and that the gyroscope is replaced by electric galvanometers with their moving-coils operated and controlled by appropriate electric remote control from the airplane.

In Fig. 7, 57, 58 are galvanometers with moving coil frames, one of the galvanometers being shown in detail in Fig. 8. The magnetic field is created by the cylindrical body 59, forming a permanent magnet, and by the core 60, also forming a permanent magnet. Mobile frame 61, with its coil, is rigidly attached to axle 62, pivotally supported from the body of the torpedo. Lever 63, rigidly mounted on axle 62, actuates, by means of rod 64 and lever 65, the rod of distributor valve 66. The displacements of piston rod 67 cause rotation of axle 55, carrying at its two ends the rudder elements 8 and 9. 68 is a spring, one end of which is rigidly attached to axle 62, and the other end 69 is fixed to the cylinder 59.

To each orientation of frame 61 there corresponds a fixed angular position of the rudders 8 and 9. The galvanometer 58 is arranged to operate the vertical rudders 12, 13 in a similar manner, requiring no separate description.

Figs. 9 and 10 show schematically the electric remote control devices, Fig. 9 the sending apparatus in the airplane, and Fig. 10 the receiving devices in the torpedo. This remote control is assumed to be effected by means of a cable, with two concentric conductors, but the said devices can easily be adapted to any other suitable manner of remote control.

In Figs. 9 and 10 there is shown a method of continuous and strictly proportional remote control by low-frequency alternating currents, particularly of four different frequencies (two for each rudder), comprised between values of, for instance, 250 and 1,000 cycles, so as to permit the utilization of a cable of small diameter.

The mechanism on the airplane comprises two revolving cylinders, 70 and 71. Each of these cylinders consists of two parts, in axial juxtaposition $70^1$, $70^2$, and $71^1$, $71^2$, but electrically insulated from each other along the lines 72 and 73; each such cylinder-half having its surface divided into two equal triangular areas of conducting and non-conducting material; the parts shaded in the drawing, $74^1$, $74^2$, $75^1$, $75^2$, are conductors, the other parts non-conductors. $76^1$, $76^2$, $77^1$, $77^2$ are contact brushes for the separate axles $78^1$, $78^2$, $79^1$, $79^2$, respectively; each such axle being in electrical communication with the corresponding conductor $74^1$, $74^2$, $75^1$ or $75^2$. 80 and 81 are sliding contacts, movable along the surfaces of the respective cylinders in a direction parallel to their axis; 82 is an insulating coupling of the two axles; 83 is an electric motor, its operation causing the cylinders to rotate at moderate speed, for instance 30 R. P. Sec.; $84^1$, $84^2$, $85^1$, $85^2$ are four alternating current generators of four different low frequencies, comprised, for instance, as mentioned between 250 and 1,000 cycles. These frequencies are so selected as not to affect each other by multiple resonance.

When sliding contact 80 bears against the non-conducting areas no current flows; but when the contact is moved, for instance, to the left, then, at each revolution of cylinder 70, an alternating current impulse is sent from generator $84^1$, through induction coil $86^1$, brush $76^1$, axle $78^1$ and conducting surface $74^1$. The duration of this impulse is determined by the conducting surface passed over by sliding contact 80. The more the latter is moved to the left, the longer the said duration, until it becomes finally continuous, when the sliding contact reaches a position to the extreme left. Shifting the sliding contact to the right produces the same results for the current of generator $84^2$, of different frequency, passing through induction coil $82^2$. In a similar manner contact 81 sends impulses of currents from generators $85^1$ or $85^2$ through induction coils $87^1$ or $87^2$. Currents in induction coils $86^1$, $86^2$, $87^1$ and $87^2$ generate, for instance, by induction, currents of corresponding frequencies in the induction coil 88 of the remote control cable 89, which is preferably composed of two concentric conductors. The said currents, two of which can be simultaneously superimposed on each other, pass through the coiled and extended cable, and reach the torpedo.

Fig. 10 shows schematically the receiving arrangement. The currents arriving through cable 89 are amplified by the amplifier designated by 90, and, according to their respective frequencies, excite the resonance circuits $91^1$, $91^2$, $92^1$ and $92^2$ which in turn act on the grids of the four thyratrons, schematically indicated by the designations $93^1$, $93^2$, $94^1$, $94^2$. In moving sliding contact 80, of Fig. 9 along its course to the left, impulses of greater or less duration are caused to be sent to the thyratron $93^1$. The thyratron current will practically integrate these different durations of impulses and will send into the movable frame 61 of galvanometer 57 (Figs. 7 and 8) a direct current of certain mean intensity which will be proportional to the sum of durations of the impulses sent per second. The deviation angle of the movable frame will therefore be proportional to the displacement of sliding contact 80; and, as previously explained, the inclination angle of rudder 8, 9 will therefore be proportional to the distance of contact 80 from line 72 (Fig. 9). The current integrated by the thyratron will not be affected by momentary variations in intensity of the currents passing through the cable, provided that these intensities do not sink below a certain value, which can be easily maintained. A displacement of slider 80 toward the right will cause in thyratron $93^2$ a mean direct current proportional to the displacement of the slider to the right. This current will be sent into the galvanometer 57 so as to produce an inverse deviation of the frame 61. Galvanometer 57 will be a differential device, for instance, having a frame with two windings traversed by currents in opposite direction, the one coming from thyratron 93¹, the other from thyratron 93². In a similar manner, rudders 12 and 13 in Fig. 7 will be controlled by slider 81 in Fig. 9 by means of the mobile frame of galvanometer 58.

In a modification of the assembly the thyratrons can be replaced, in a known manner, by ordinary triode tubes.

For instance, a tube amplifier can be used, regulating the apparatus in such a manner that the intensity of the current coming from the last amplifier tube has a generally constant value, by utilizing, for instance, the characteristic amplification curve in the area close to saturation. The deviation of the galvanometer will in such case be dependent only on the integration of the impulses of the current. An even better result may be obtained by utilizing an assembly known as "electronic contactor."

Fig. 11 represents schematically the torpedo, with the various compartments in its rear part, which is more or less cylindrical and with the lighting flares attached to the extreme ends of the wings. In this figure the parts already described are the same as in Figs. 3, 4, 5, 7 and 10. In addition, in this drawing, 95 is a compartment containing a coil of cable serving to transmit the remote control, said cable starting to unwind through the center inside part of the coil. The coil is coated and impregnated with a paste, glue, or other appropriate substance, for the purpose of creating a certain mechanical resistance to the unwinding and to prevent spontaneous unwinding of several coil turns simultaneously. In addition and with the same object in view, the successive layers of winding are strengthened by the insertion between, and pasting on, each layer of cable, of a layer of paper.

The compartment containing the coiled cable is separated along the partition line 96 from compartment 97, containing the two rudder axles 55 and 56; compartment 98, into which enters the fixed rear end of cable 89 (this connection is not shown in the drawing), contains the receiver apparatus, resonance circuits, amplifiers, etc., shown in Fig. 10. The next compartment, 99, contains the gyroscopic stabilization mechanism of the torpedo, with axle 20 controlling the ailerons 14 and 15, it being understood that the illustration of rudder and aileron controls in Figs. 3, 4, 5 and 7 greatly exaggerates the proportions in order to show more clearly the principles of operation.

To the extreme ends of the wings 2 and 3 are attached powerful flares 100, with their luminous parts directed toward the rear of the torpedo. These flares are attached to the wings by supports 101; the fastening being not rigid so that the flare is movable to a certain extent about its attachment point. A second support 102 is intended to maintain the flare temporarily in its position, but this support will, generally, be destroyed by the heat, when the combustion reaches that level. The flare will then remain fixed by its attachment to the support 101 and will be maintained in a proper position by the air current.

In Figs. 12 and 13 is shown a type of control mechanism suitable for use by the operator in an airplane for guiding the flight of the torpedo. A control handle 103 is mounted on a universal joint 104 in such a manner that forward and backward movement of the handle (right and left in the drawing) will cause rotation of the shaft 105, while sideway motion (at right angles to the plane of the drawing) will cause rotation of the shaft 106, and a combination of motions will rotate both shafts to any necessary degree. The shaft 105 has fixed thereon a pulley or sprocket wheel 107 over which runs a belt or chain 108 carrying the sliding contact point 80. The shaft 106 has fixed thereon a bevel gear 109 engaging with a bevel gear 110, which may be formed integral with a pulley or sprocket 111 for the belt or chain 112 carrying the sliding contact point 81. The belts or chains 108 and 112 run over idle pulleys or sprockets 113 and 114, respectively; and the contacts 80 and 81 are positioned to pass along the surfaces of cylinders 70 and 71 as explained in connection with Fig. 9. With a control of this type the operator may readily adjust the rudders of the torpedo for guiding it forward or backward, or to either side, and may, when necessary, operate both pairs of rudders simultaneously by simple and natural motions of a single handle, so that the torpedo may be steered in any direction throughout a full 360°.

Fig. 14 shows schematically a section of a possible installation of two torpedoes in an airplane. The fuselage of the airplane is designated by 115, the wings by 116. It can be seen that half of the wings and tail can be arranged to fit closely against the plane's fuselage.

Fig. 15 shows the same installation in lateral view. In this figure the coil 117 of the cable 89 is shown installed in the fuselage, with the cable leading to the torpedo. Coil 117 should preferably be pivoted about a transverse axis 118 so that its longitudinal axis will automatically orient itself in the direction of the tension of the cable.

In an important modification, remote control may be effected by means of a cable with a single non-insulated electric conductor, such cable consisting, for instance, of steel wires of high mechanical resistance. The cable can have a diameter of less than 1 mm., and its volume will be very small. It can utilize, in the airplane, the same type of remote control apparatus with four frequencies.

For the purposes of the present case, reference may be made to Fig. 16 which shows schematically the method of electric connection with the airplane for one of the frequencies. Cable 120 is connected by its upper end to the metallic part of the airplane 121 forming a capacity. The four currents of different frequencies are induced in the secondary coil 122 of the cable by the primary induction coils 123¹, 123², 124¹ and 124² of the four oscillating circuits, corresponding to the coils 86¹, 86², 87¹ and 87² in Fig. 9. The currents could also be produced by four generators of corresponding frequencies. The cable unrolls from coil 125 which is normally short-circuited within itself, as the cable is not insulated. Coil 122 and its outlet opening for the cable are heavily insulated by insulating enclosures 126 and 127. A high-voltage alternating current is induced at the terminals of the induction coil 122. This voltage will normally be from 2,000 to 10,000 volts, but can, if necessary, reach much higher voltages. The four different frequencies will be transmitted along the cable to coil 128, also insulated, in the rear compartment 95 of the torpedo 1 (Fig. 11). Coil 128, also short-circuited on itself, is connected through the primary winding 129 of a step-down transformer to the body of the torpedo, for instance to the partition 96; the transformer's secondary winding 130 is connected to the amplifiers (filters, oscillation selector circuits, etc., as shown in Fig. 10), located in compartment 98. The step-down transformer with windings 129, 130 constitutes the first protection against parasitic or interfering currents and jumbling. Known means are provided to have the voltage induced in induction coil 122 on the airplane be at a minimum value at the start, at the moment of the torpedo's release, and increase thereafter as a function of time, reaching its maximum value at the end of, for instance, 40 seconds, when the torpedo hits the objective. This will compensate for the difference in falling-off (of the voltage) along the cable, and will give a more or less constant value near the torpedo. The four frequencies transmitted are preferably low ones, as in the case of a cable having two conductors, being contained between the values of 200 and 1,000, without resonance between each other (for instance 500, 700, 900, 1,100).

Suitably modified, the present system may be able to utilize higher frequencies.

By inducing, on the airplane, a potential in the cable of the order, for instance of 10,000 volts, it will be possible to obtain at the torpedo a potential, for instance of 70 volts, which is very much greater than the small voltage necessary to actuate the amplifier grid, and it will be possible to considerably lower the voltage, by means of the step-down transformer, for actuating the grid. This permits a very considerable reduction in the sensitiveness to interference, and this in turn will provide a practical and very efficient protection against defensive interference or jumbling.

While remote control by ordinary wireless means utilizing Hertzian waves involves certain disadvantages which have been mentioned above, practical and efficient remote control is possible through the use of directed short wave beams produced on the airplane and aimed toward the torpedo. This arrangement utilizes certain peculiar qualities of flight of the torpedoes described above, namely (1) the fact that shortly after the release of the torpedo from the airplane the trajectory becomes almost vertical, with the axis of the torpedo forming only a slight angle with the vertical; (2) the fact that, in the preferred procedure, the airplane is almost vertically over the objective or target and at a high altitude, so that the angle of direct sight from the airplane varies only slightly during the descent of the torpedo; (3) the fact that the torpedo generally follows certain definite trajectories which are previously determined; and (4) the fact that the orientation of the torpedo about its longitudinal axis remains constant so that the orientation of the polarization of the receiver also remains constant.

The airplane is provided with a suitable transmitter of short wave beams which are aimed downward toward the torpedo in its more or less vertical flight, and provision is made to orient progressively the axis of the beam in such a manner that it points at all times in the direction of the torpedo. Provision is also made on the torpedo for the directional reception of the short waves, the receiver being continuously and automatically oriented toward the airplane. The automatic aiming of the transmitter and receiver toward each other is made possible by the fact that the trajectory of the torpedo and the path of flight of the airplane may be quite definitely determined in advance. Maximum effectiveness and maximum protection against interference or jumbling will thus be obtained.

Good results will be obtained through the utilization of very short waves which are capable of being directed from the airplane and received by the torpedo by means of parabolic reflectors or exponential horns at the transmitting and receiving stations or, if desired, at the transmitting station only. Taking into consideration the present state of the art and the proposed dimensions of the rear end of the torpedo, a wave length of the order of 10 centimeters is considered suitable.

Referring to Fig. 17, a short wave transmitter 131 is located in the under part of the airplane and designed to transmit along a narrow beam the axis of which is indicated at 132. A torpedo 133 is represented as being guided along an artificial trajectory, for example that designated E in Fig. 2, in which case the longitudinal axis 134 of the torpedo will be substantially vertical; and the torpedo is provided at its rear end with a directional short wave receiver 135 which is automatically operated to follow continuously the direction of the beam 132.

The transmitter 131 and its control mechanism are shown in somewhat more detail in Fig. 18, wherein it will be seen that the parabolic reflector 136 is supported by an axle 137 pivotally mounted in cross pieces 138. The reflector 136 is also attached to a casing 139 adapted to contain the transmitting apparatus, not shown, and a suitable antenna 140 is located at the focal point of the reflector. The reflector and casing are rocked to different angular positions by means of an arm 141 having at its end a cam follower 142 which rests against the cam 143, and the cam is adapted to be rotated by means of an electric motor 144 driving a worm gear 145. The profile of the cam 143 is shaped to correspond to the variation of the angle of sighting the torpedo from the airplane, as a function of the falling time of the torpedo along a trajectory which may be approximately predetermined. It will be understood that the motor 144 may be replaced by any equivalent mechanism such as a spring operated clock mechanism; or the transmitter may, if desired, be aimed manually in the proper direction, as by association with the sighting device used to observe the direction of flight of the torpedo toward the target. The cross pieces 138 rest at their ends adjacent the walls 146, 146' which define a window in the bottom surface of the airplane, this window being preferably closed by a partition or shield 147 of material which is transparent to short waves, as for instance, a suitable plastic material.

Fig. 19 represents the receiving set in the rear part of the torpedo 133, enclosed for protection and aerodynamic efficiency by a cap or shield 148 which may be made of the same material as that used for the partition or shield 147. The short waves transmitted along the beam 132 are collected and focused in a parabolic receiver (or exponential horn) 149 associated with a casing 150 adapted to contain the receiving apparatus; the receiver and casing being pivotally mounted on an axle 151 and carrying a lever 152, the end of which is connected to a push rod 153. The push rod rests against a cam 154 which is driven by an electric motor (or equivalent mechanism) 155; the profile of the cam 154 being shaped to correspond substantially to the predetermined variation of the angle between the longitudinal axis of the torpedo and a line from the torpedo to the airplane. The relative positions of the transmitter and receiver are shown not only in Fig. 17 but also in Figs. 18 and 19 taken together.

Short waves in general, and particularly those whose length is measured in centimeters, are notably difficult to jumble, and thus are especially suitable for use in the remote control of aerial torpedoes. The possibility of interference or jumbling is still further reduced by the use of the devices described above. The directional control of the flight of the torpedo is effected in accordance with the method described and shown particularly in Figs. 9, 10 and 16, in that the fundamental carrier frequency of short waves (e. g. 10 cm.) is modulated by one or more of the four control frequencies in order to cause the desired motion of the torpedo rudders. The method of impulse modulation may desirably be utilized in a known manner for the transmission just described.

It will be understood that various changes may be made in the construction, form and arrangement of the several parts without departing from the scope of my invention and hence I do not intend to be limited to the particular embodiment herein shown and described, but what I claim is:

1. The method of controlling the flight of a dirigible aerial torpedo toward a target from a controlling station moving through space at high velocity which includes, mutually coordinating the trajectory imposed on the torpedo from the controlling station and the speed of the torpedo with the trajectory and speed of the controlling station imposed thereon by its pilot, said coordination being such that the torpedo and station will, at a certain moment, be on the same direct line of sight to the target, and maintaining mutual coordination of the trajectories and speeds of the torpedo and station on the direct line of sight after said moment while using said established line of sight as the criterion for precise guiding of the torpedo to the target.

2. The method according to claim 1 in which the guidance of the torpedo includes corrections of its trajectory in a direction comprised in a vertical plane passing through the controlling station and the target.

3. The method according to claim 1 in which the guidance of the torpedo includes corrections of its trajectory in a tranverse direction with respect to a vertical plane passing through the controlling station and the target.

4. The method according to a claim 1 in which the guidance of the torpedo includes corrections of its trajectory both in a direction comprised in a vertical plane passing through the controlling station and the target and in a transverse direction with respect to said plane.

5. The method of operating a remote controlled dirigible aerial torpedo of the type adapted to be carried by and released from an airplane which includes, carrying the torpedo to a substantial altitude, releasing the torpedo, causing the torpedo to be maintained substantially in the vertical plane passing through a controlling airplane and the target, maneuvering the airplane to a position relative to the torpedo such that the torpedo is, during a final and substantial part of its trajectory, on the direct line of sight from the airplane to a target, using this relationship as the criterion for guiding the torpedo toward the target, and maintaining said relationship until the torpedo reaches the target.

6. The method according to claim 5 in which the guidance of the torpedo includes corrections of its trajectory in a direction comprised in said plane.

7. The method according to claim 5 in which the guidance of the torpedo includes corrections of its trajectory in a transverse direction with respect to said plane.

8. The method according to claim 5 in which the guidance of the torpedo includes corrections of its trajectory both in a direction comprised in said plane and in a transverse direction with respect to said plane.

9. The method of operating a remote controlled dirigible aerial torpedo of the type adapted to be carried by and released from a first airplane which includes, carrying the torpedo to a substantial altitude, releasing the torpedo, causing the torpedo to be maintained substantially in the vertical plane passing through a controlling second airplane and the target, maneuvering the second airplane to a position relative to the torpedo such that the torpedo is, during a final and substantial part of its trajectory, on the direct line of sight from the airplane to the target, using this relationship as a criterion for guiding the torpedo toward the target, and maintaining said relationship until the torpedo reaches the target.

10. The method according to claim 9 in which the guidance of the torpedo includes corrections of its trajectory in a direction comprised in said plane.

11. The method according to claim 9 in which the guidance of the torpedo includes corrections of its trajectory in a transverse direction with respect to said plane.

12. The method according to claim 9 in which the guidance of the torpedo includes corrections of its trajectory both in a direction comprised in said plane and in a transverse direction with respect to said plane.

13. The method of operating a remote controlled dirigible aerial torpedo of the type adapted to be carried by and released from an airplane which includes, carrying the torpedo to a substantial altitude, releasing the torpedo, causing the torpedo to follow an abnormal trajectory, maneuvering an airplane to a position relative to the torpedo such that the torpedo is, during a final and substantial part of its trajectory, on the direct line of sight from the airplane to a target, using this relationship as the criterion for guiding the torpedo toward the target, and maintaining said relationship until the torpedo reaches the target.

14. The method of operating a remote controlled dirigible aerial torpedo of the type adapted to be carried by and released from an airplane which includes, carrying the torpedo to a substantial altitude, releasing the torpedo, causing the airplane from which the torpedo was released to continue in substantially normal flight, steering the torpedo out of its normal trajectory to a position relative to the airplane such that it is, during a final and substantial part of the torpedo's trajectory, on the direct line of sight from the airplane to a target, and steering the torpedo thereafter along a trajectory such that said relationship is maintained as the criterion for guiding the torpedo until the torpedo reaches the target.

15. The method of operating a remote controlled dirigible aerial torpedo according to claim 14 which includes, steering the torpedo relatively abruptly out of its normal trajectory into a trajectory substantially vertical or rearwardly inclined with respect to the normal direction of flight of the airplane.

16. The method of operating a remote controlled dirigible aerial torpedo according to claim 14 which includes, providing a continuous electrical connection between the airplane and the torpedo.

17. The method of operating a remote controlled dirigible aerial torpedo according to claim 14 which includes, providing an extensible cable to constitute a continuous electrical connection between the airplane and the torpedo.

18. The method of operating a remote controlled dirigible aerial torpedo according to claim 14 which includes, providing an extensible cable to constitute a continuous electrical connection between the airplane and the torpedo, and extending said cable by unwinding both from the airplane and from the torpedo.

19. The method according to claim 14 which includes controlling the steering of the torpedo through a short wave beam directed from the airplane to the torpedo.

20. The method according to claim 14 which includes controlling the steering of the torpedo through a short wave beam from a directional transmitter on the airplane to a directional receiver on the torpedo, and varying the aiming of said transmitter and receiver to correspond substantially with the line of direct sight between the airplane and the torpedo.

21. In a remote controlled dirigible aerial torpedo of the character described, a continuous electrical connection between the airplane and the torpedo, consisting in a directional transmitter of a short wave beam on the airplane, a directional short wave receiver on the torpedo, and synchronized driving means for varying automatically the aiming of said transmitter and receiver to correspond substantially with the line of direct sight between the airplane and the torpedo throughout at least a major part of the torpedo's trajectory.

CONSTANTIN CHILOWSKY.

REFERENCES CITED

The following references are of record in the file of this patent:

UNITED STATES PATENTS

| Number | Name | Date |
| --- | --- | --- |
| 293,735 | Henderson | Feb. 19, 1884 |
| 941,111 | Tasto | Nov. 23, 1909 |
| 1,181,190 | Welton | May 2, 1916 |
| 1,249,274 | Chandler | Dec. 4, 1917 |
| 1,304,314 | Hill | May 20, 1919 |
| 1,384,559 | Giles et al. | July 12, 1921 |
| 1,384,868 | Sperry et al. | July 19, 1921 |
| 1,597,416 | Mirick | Aug. 24, 1926 |
| 1,818,708 | Hammond | Aug. 11, 1931 |
| 2,152,144 | Minelli | Mar. 28, 1939 |
| 2,165,800 | Koch | July 11, 1939 |
| 2,258,281 | Dunajeff | Oct. 7, 1941 |
| 2,317,383 | Hull | Apr. 27, 1943 |

FOREIGN PATENTS

| Number | Country | Date |
| --- | --- | --- |
| 441,866 | Great Britain | Jan. 27, 1936 |